(12) United States Patent
Kyle et al.

(10) Patent No.: US 11,489,867 B2
(45) Date of Patent: Nov. 1, 2022

(54) CYBERSECURITY EMAIL CLASSIFICATION AND MITIGATION PLATFORM

(71) Applicant: JPMorgan Chase Bank, N.A., NY, NY (US)

(72) Inventors: Mackenzie Kyle, New York, NY (US); Dennis Rhodes, New Rochelle, NY (US); Benjamin Arnold, New York, NY (US); Oscar Chan, Elmhurst, NY (US); Bradley N. Gunner, Hoboken, NJ (US); Rohith Kondeti, Jersey City, NJ (US); Yue Lin, Brooklyn, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 738 days.

(21) Appl. No.: 16/400,493

(22) Filed: May 1, 2019

(65) Prior Publication Data

US 2020/0351302 A1 Nov. 5, 2020

(51) Int. Cl.
*H04L 9/40* (2022.01)
*G09B 5/02* (2006.01)
*G06K 9/62* (2022.01)
*H04L 51/212* (2022.01)

(52) U.S. Cl.
CPC ........ *H04L 63/1483* (2013.01); *G06K 9/6267* (2013.01); *G09B 5/02* (2013.01); *H04L 63/145* (2013.01); *H04L 63/1416* (2013.01); *H04L 63/1425* (2013.01); *H04L 51/212* (2022.05)

(58) Field of Classification Search
USPC ......................................................... 726/22
See application file for complete search history.

(56) References Cited

U.S. PATENT DOCUMENTS

| | | | | |
|---|---|---|---|---|
| 10,601,865 | B1* | 3/2020 | Mesdaq | H04L 63/1425 |
| 10,652,276 | B1* | 5/2020 | Rambo | H04L 63/1433 |
| 2007/0294352 | A1* | 12/2007 | Shraim | H04L 63/1483 |
| | | | | 709/206 |
| 2010/0306845 | A1* | 12/2010 | Vaithilingam | H04L 51/212 |
| | | | | 709/206 |
| 2016/0006749 | A1* | 1/2016 | Cohen | H04L 63/1408 |
| | | | | 726/23 |
| 2017/0078321 | A1 | 3/2017 | Maylor et al. | |
| 2018/0191754 | A1 | 7/2018 | Higbee et al. | |
| 2018/0276389 | A1* | 9/2018 | Grafi | H04L 63/1425 |
| 2019/0158530 | A1* | 5/2019 | Emigh | H04L 63/1483 |
| 2020/0204587 | A1* | 6/2020 | Hunt | G06F 21/128 |

OTHER PUBLICATIONS

International Search Report and Written Opinion in corresponding International Application No. PCT/US20/30800, dated Aug. 3, 2020.

* cited by examiner

*Primary Examiner* — Sakinah White Taylor
(74) *Attorney, Agent, or Firm* — Greenblum & Bernstein, P.L.C.

(57) ABSTRACT

Systems and methods for classifying and mitigating security threats in a digital communication network are provided. A digital communication that has been identified as suspicious may be parsed to identify various content indicators contained in the communication. Processing may then be performed on the digital communication to determine if the digital communication comprises malicious content. Mitigation activities may be performed when malicious content is identified.

18 Claims, 3 Drawing Sheets

CYBERSECURITY EMAIL CLASSIFICATION AND MITIGATION PLATFORM

TECHNICAL FIELD

The present disclosure generally relates to methods and systems for tracking, analyzing, and mitigating security threats in digital communication networks.

BACKGROUND

For large organizations, it is often burdensome to monitor email and other digital communications to prevent malicious messages or the spreading of malicious material, e.g. phishing attempts, malware, etc. In many situations, the system administrators responsible for preventing the malicious communications rely on users to report communications that they suspect might be coming from a malicious source. However, large organizations may receive in excess of 25,000 identified digital communications per month, and individually investigating every reported email is impractical or impossible. Antivirus software, firewalls, and other security measures are often utilized, but fail to adequately protect against or identify many versions of malicious content.

Malicious content can take many different forms. Commonly, malicious content will be in the form of phishing attempts and/or malware attacks. A phishing attempt is an attempt to gain sensitive information—such as usernames, passwords, credit card details, or other personal information—from a user by disguising as a trustworthy entity in a digital communication. Malware is software intentionally designed to cause damage to or spy on a computer, server, or computer network. Malware often takes the form of executable code, scripts, active content or other software that can be downloaded to a computer (often times by opening an attachment or clicking on an embedded hyperlink). Users downloading malware from hostile digital communications or entering sensitive information into online forms presents a significant security vulnerability in networked systems.

It is therefore appreciated that a need exists for improved systems and methods for classifying and mitigating security threats associated with digital communications.

SUMMARY

In an exemplary embodiment, a computer implemented method for classifying and mitigating security threats in a digital communication network is provided. The method comprises: receiving a digital communication from a user, wherein the digital communication has been identified as suspicious by the user; parsing the digital communication to identify at least one content indicator; performing at least one processing activity based on the at least one content indicator, wherein performance of a processing activity generates an output; determining if the digital communication comprises malicious content based on the output generated by the at least one processing activity; and performing at least one mitigation activity if the digital communication comprises malicious content.

In another exemplary embodiment, a system for classifying and mitigating security threats in digital communication networks is provided. The system comprising: a classification and mitigation system configured to receive a digital communication from a user, wherein the digital communication has been identified as suspicious by the user; parse the digital communication to identify at least one content indicator; perform at least one processing activity based on the at least one content indicator, wherein performance of a processing activity generates an output; determine if the digital communication comprises malicious content based on the output; and, perform at least one mitigation activity if the digital communication comprises malicious content.

In yet another exemplary embodiment, a method for training users to classify and mitigate security threats in a digital communication network is provided. The method comprising: transmitting a training communication to a user, wherein the training communication has at least one suspicious content indicator; receiving a digital communication from the user, wherein the digital communication has been identified as suspicious by the user; parsing the digital communication to identify the at least one suspicious content indicator; determining if the digital communication received from the user is the same as the training communication; if the digital communication received from the user is the same as the training communication, sending a notification indicating completion of training.

These and other objects, features and advantages of the present disclosure will become apparent from the following detailed description of illustrative embodiments thereof, which is to be read in connection with the accompanying drawings.

BRIEF DESCRIPTION OF THE DRAWINGS

These and other features of the present disclosure will become better understood with regard to the following description and accompanying drawings in which.

DETAILED DESCRIPTION OF THE DISCLOSURE

Aspects and implementations of the present disclosure will be understood more fully from the detailed description given below and from the accompanying drawings of the various aspects and implementations of the disclosure. This should not be taken to limit the disclosure to the specific aspects or implementations, but explanation and understanding only.

Figure 1:
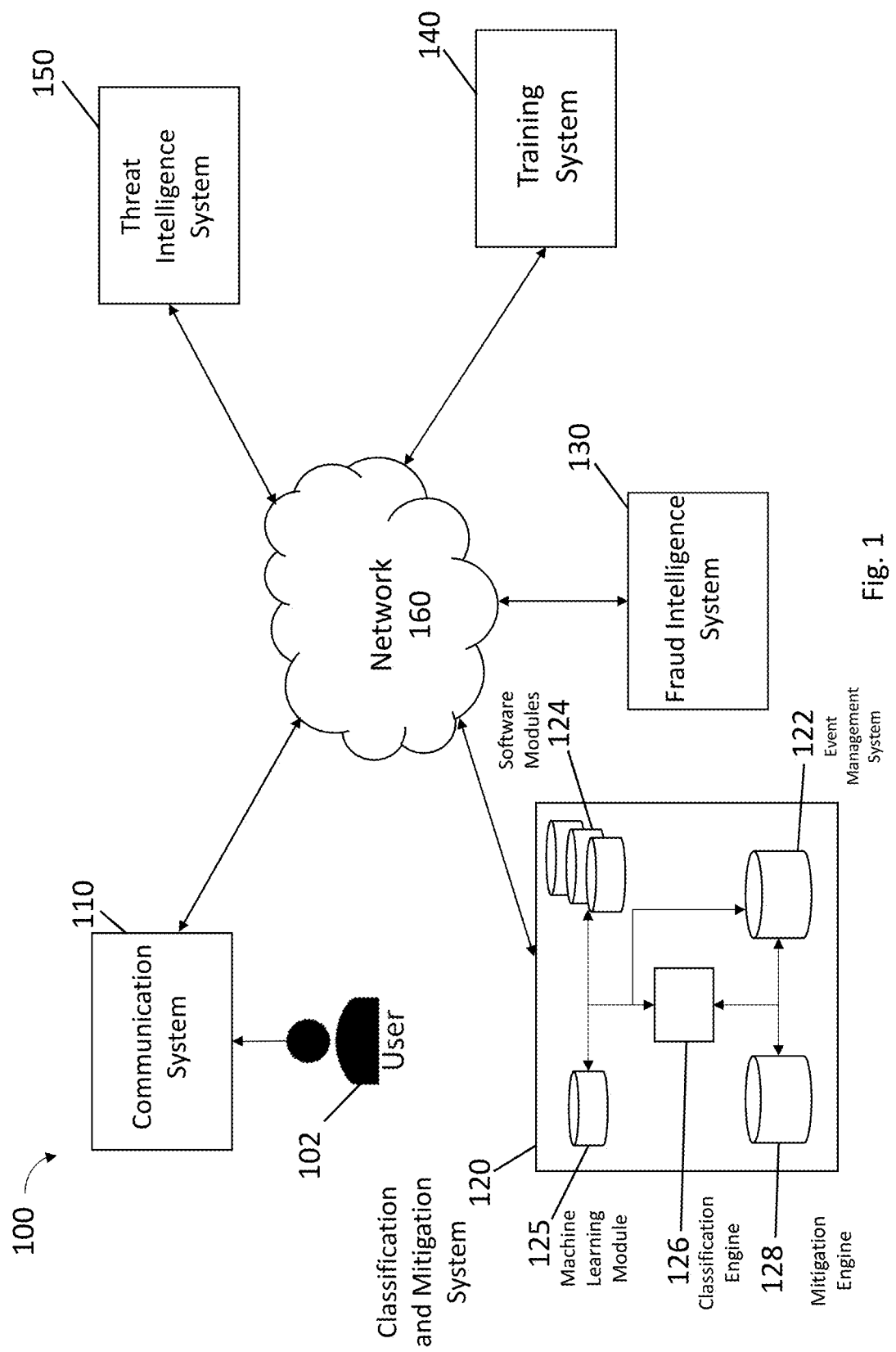
FIG. 1 illustrates an exemplary system for classifying and mitigating security threats in digital communication networks.

FIG. 1 illustrates an exemplary system 100 for classifying and mitigating security threats in a digital communication network. System 100 may comprise a communication system 110, a classification and mitigation system 120, a fraud intelligence system 130, a training system 140, and a threat intelligence system 150. The various components of system 100 may be configured to communicate over a network 160. Network 160 may comprise one or more computers or servers in electronic communication with one another, e.g. a local area network (LAN), an intranet, an extranet, the Internet, etc. It will be appreciated that in certain embodiments, communication system 110, classification and mitigation system 120, fraud intelligence system 130, training system 140, and threat intelligence system 150 may be combined in one or more computing devices.

According to certain aspects of system 100, a user 102 may interact with communication system 110 to conduct various communication activities, e.g. send and/or receive email, instant messages, or the like. It will be appreciated that, as used herein, communications and messages may be used interchangeably. Communication system 110 may comprise a computing device, e.g. laptop or desktop computer, smart phone, tablet, etc., configured with one or more communication applications capable of sending and receiving digital communications. Upon receiving digital communications, user 102 may encounter suspicious or malicious content. This content may appear suspicious, for example, due to frequent misspellings, incorrect domain names, broken links, typos, grammatical mistakes, awkward language, missing words, extra spaces, non-typical identification information (e.g., a suspicious email address), abnormal requests, and/or various signs that the communication was written or conducted unprofessionally. In some cases, the communication may ask the user 102 to look at an attachment or click a link—within which a request may be made for personal information to be input on a web-page or in a form. In some cases, when an attachment or a link are clicked, malware, spyware, and/or other malicious content may be automatically downloaded, installed, or otherwise loaded onto the communication system 110.

Upon identifying a communication as suspicious, the user 102 may flag, report, or otherwise identify the communication to be reviewed by the classification and mitigation system 120. In some embodiments, the user 102 may forward the suspicious communication, e.g. as an email and/or attachment, to a predetermined alert email address associated with the classification and mitigation system 120. In some embodiments, the user may have an option to flag suspicious communications on a user interface at communication system 110, wherein a flagged suspicious communication will then be automatically transmitted or otherwise made available to the classification and mitigation system 120. In some embodiments, once identified, the suspicious digital communication may be automatically deleted at the communication system 110 after a copy has been forwarded to the classification and mitigation system 120. In some embodiments, communications may be automatically recognized as suspicious at communication system 110. For example, communication system 110 may be associated with programs operable to recognize and flag potentially suspicious communications and forward them for analysis at the classification and mitigation system 120. In certain embodiments, programs associated with communication system 110 may generate an alert in response to a received communication, which then may trigger the automatic transmission of the communication to the classification and mitigation system 120.

Upon receipt of a digital communication that has been identified as suspicious by user 102, classification and mitigation system 120 may parse the communication, for example, in an email, parse the headers and the body of the message to identify and classify content indicators contained within the message. Certain aspects of the communication may be classified and categorized as content indicators, for example, if the communication contains a hyperlink, the sender address, the subject, if there are attachments, the recipient address, the sending domain/IP, body keywords, etc. It will be appreciated that various other aspects of the communication may be recognized by the classification and mitigation system 120. In certain embodiments, the content indicators may enable the classification and mitigation system 120 to identify and classify the communication as a particular type of malicious message, e.g. a phishing message. In certain embodiments, the classification and mitigation system 120 may identify a message as a training message, such as those generated by training system 140. In certain embodiments, classification and mitigation system 120 may be able to quickly determine that a communication is not suspicious or malicious based on certain content indicators. For example, communications that are from trusted or approved senders may be automatically determined to be non-malicious. In such cases, the classification and mitigation system 120 may remove the communication from processing and send a notification to user 102 to indicate that the identified communication is non-malicious, e.g. because it originated from a trusted source. In some embodiments, classification and mitigation system 120 may remove or delete a received communication that is recognized to be duplicative of a previously reported communication.

In some embodiments, the classification and mitigation system 120 comprises one or more software modules 124 configured to perform a plurality of steps to classify and mitigate security threats in a digital communication network. Software modules 124 may comprise one or more applications for performing various processing activities, for example, but not limited to, processing, analyzing, and/or modifying digital communications. For example, software modules 124 may comprise applications configured to analyze links and attachments in the digital communication, scan for viruses, identify malicious links, check for brand infringement, verify identify of the sender, etc. For example, some embodiments may utilize applications such as, but not limited to, FireEye Email Security, VirusTotal, ThreatConnect Analysis, Cuckoo Sandbox Analysis, BlueCoat Analysis, etc. It will be appreciated that additional functions and analysis may be performed by software modules 124 to classify and mitigate threats in the digital communications.

Classification and mitigation system 120 may further comprise a machine learning module 125. Machine learning module 125 may work in connection with software modules 124 to perform processing activities associated with a communication received at the classification and mitigation system 120. Machine learning module 125 may be configured to identify certain content indicators, e.g. groupings of text, that are indicative of malicious content. In certain embodiments, the machine learning module 125 is trained using a set of communications exemplary of malicious or suspicious content. The machine learning module 125 may evaluate text of a communication received at classification and mitigation system 120 for similar content or content indicators as those in the training set. In some embodiments, machine learning module 125 may be updated and/or modified using communications (and/or their associated content indicators) that have been previously analyzed by classification and mitigation system 120. It will be appreciated that in certain embodiments, software modules 124 and/or machine learning module 125 may record or log results of their processing activity, e.g. outputs, at event management system 122.

In some embodiments, classification and mitigation system 120 may be configured to interface, e.g. over network 160, with software modules 124 that may be hosted on third party servers to enhance data and analysis performed at the classification and mitigation system 120. In some embodiments, software modules 124 may generate outputs which may be transmitted to an event management system 122 to be logged, recorded, saved, etc. Event management system 122 may be configured to capture, index, and/or correlate real-time or near real-time data from reported digital communications and/or outputs from processing of such communications at software modules 124 and/or machine learning module 125. In certain embodiments, event management system 122 may create a searchable repository of communications and/or their content indicators and other characteristics. For example, in some embodiments, event management system 122 may be configured to incorporate use of Splunk, a software platform to search, analyze and visualize machine-generated data gathered from websites, applications, sensors, devices etc. which make up an organization's IT infrastructure. In some embodiments, event management system 122 may comprise one or more digital storage modules configured to store digital communications and data related thereto.

In some embodiments, after processing of a communication by software modules 124 and/or machine learning module 125, classification and mitigation system 120 may be configured to classify a communication as one of non-malicious, malicious, spam, or undetermined. Such classification may be performed via a classification engine 126. Classification of a communication at classification engine 126 may encompass evaluating outputs or other data received from the software modules 124 and/or machine learning module 125. The classification of a communication at classification engine 126 may be also be referred to herein as a verdict. If a communication is identified as non-malicious, the communication and/or a description of the characteristics of the communication may be logged in the event management system 122.

In some embodiments, classification of a communication as non-malicious, malicious, spam, or undetermined by classification engine 126 may be performed according to a confidence interval. For example, classification engine 126 may classify a communication as malicious so long as it is determined with >90% confidence that the communication is malicious. It will be appreciated that the confidence interval utilized by classification engine 126 may vary according to user preference or other factors associated with the communication received by the classification and mitigation system 120. In certain embodiments, classification engine 126 may perform a classification using only machine learning module 125 or only software modules 124. In some embodiments, these discrete classifications may be compared to reach a final classification verdict with regard to a communication. In such embodiments, classification engine 126 may trigger performance of additional processing activities when the classification using the machine learning module 125 and the classification using the software modules 124 are not consistent. In some embodiments, a notification may be generated and transmitted to user 102 to indicate the verdict classification of the communication as determined by the classification engine 126. If the communication is identified as spam, spam mitigation activities may be performed by the mitigation engine 128. Example spam mitigation activities include, but are not limited to, forwarding a communication to third party spam filter provider, moving the message into a spam folder associated with user 102 and/or communication system 110, and/or updating internal spam filters. In some embodiments, a notification may be generated and transmitted to user 102 indicating that the reported communication was classified as spam and not malicious. If spam mitigation activities are performed by the mitigation engine 128, the activity may be logged at event management system 122. If a communication is unable to be classified, or classified as undetermined, a notable event notification may be generated and logged at the event management system 122.

If the communication is identified as malicious by classification engine 126, the communication may be passed to the mitigation engine 128 for performance of one or more mitigation activities. In certain embodiments, malicious communication may be identified and categorized according to an indicator of compromise (IOC). Depending on the characteristics of the IOC, the mitigation engine 128 may take additional action with regard to the communication, such as blacklisting a sender or originating domain. In some embodiments, malicious mitigation activities may include quarantining digital communications from the inbox of other users, adding the digital communication to blacklists, and alerting or triggering various third-party lists and applications to mitigate the threat posed by the digital communication. In some embodiments, additional steps may include determining if the digital communication has already been blocked or mitigated, or if analysts should be alerted of the digital communication for further review. Other malicious mitigation activities performed may include moving the digital communication from the inbox of the reporting user, e.g. user 102 to a communication storage, e.g. at event management system 122. Another such additional action may comprise performing additional processing, e.g. via software modules 124. Additional processing may further indicate that the message is non-malicious. If a communication is determined to be non-malicious after the additional processing, the domain and/or sender may be removed from a blacklist or similar quarantine. In certain embodiments, a blacklist or quarantine may be temporary, e.g. 48 or 72 hours. In some embodiments, mitigation engine 128 may determine that content indicators of the malicious message may indicate future repeat attacks and notify an analyst of the malicious communication. In some embodiments, classification and mitigation system 120 may be configured to perform additional triage processing such as, but not limited to, determining if additional human review/classification of the communication is necessary. In some embodiments, triage processing may result in classification and mitigation system 120 automatically generating a support ticket or the like to indicate that further review of the communication is necessary.

Once a communication has been identified as malicious by classification and mitigation system 120, the classification and mitigation system 120 may determine if content indicators are present that indicate brand mitigation is required. Some malicious messages may contain unauthorized use of protected brands, trademarks, or the like, in order to appear legitimate to a user. Additional examples of digital communications that may require brand mitigation include, but are not limited to, malicious communications using company names, logos, employee names, signatures, images, or other brand related features included in the communication. Once such a determination has been made, the classification and mitigation system 120 may transmit the communication to the fraud intelligence system 130. Fraud intelligence system 130 may be configured to engage in brand mitigation activities. For example, if a communication identified as using protected trademarks, takedown letters, emails, or similar communications may be automatically generated. In the event mitigation activities are performed, a log may be created in event management system 122 which may detail the type of brand infringement, e.g. unauthorized use of tradename or logo, and the brand mitigation activity performed.

In some embodiments, training system 140 may be configured identify a user 102 that has been subject to a particular malicious attack and assign the user training materials to educate the user about the type of attack and how to report such attacks in the future. In some embodiments, the training system 140 may be configured to send digital communications to a user 102 with intentionally suspicious subject matter in order to "test" the user's ability to identify suspicious material and forward the material to classification and mitigation system 120. Training system 140 may be further configured to provide training materials to a user, such as, but not limited to, information on the types of malicious communications, "how-to" guides related to spotting malicious content, interactive training applications, exemplary malicious communications, etc. In some embodiments, a user 102 is assigned activities/materials associated with training system 140 based on the level of interaction with a message that has been classified as malicious. For example, if a user 102 clicked on any hyperlink in a communication that is later determined to be malicious, they may be assigned training materials/activities by training system 140. In some embodiments, training system 140 may identified users, e.g. user 102, that are vulnerable to suspicious or malicious content or communications. Training system 140 may then communicate with classification and mitigation system 120 and/or communication system 110 to indicate that the identified user may require enhanced monitoring.

Threat intelligence system 150 may be configured to receive data related to mitigation activities performed at classification and mitigation system 120. Threat intelligence system 150 may be further configured to perform a threat intelligence activity related to the data received from the classification mitigation system 120. In some embodiments, threat intelligence system 150 may be associated with one or more repositories containing indicators of compromise. These repositories may be cross-referenced by the classification and mitigation system 120 for purposes of classification and mitigation of security threats. In other embodiments, classification and mitigation system 120 may transmit data related to its processing, classifying, and mitigation, of security threats to threat intelligence system 150.

It will be appreciated that event management system 122 may be configured to automatically log data related to the activities performed at the classification and mitigation system 120, the fraud intelligence system 130, the training system 140, and/or the treat intelligence system 150.

Figure 2:
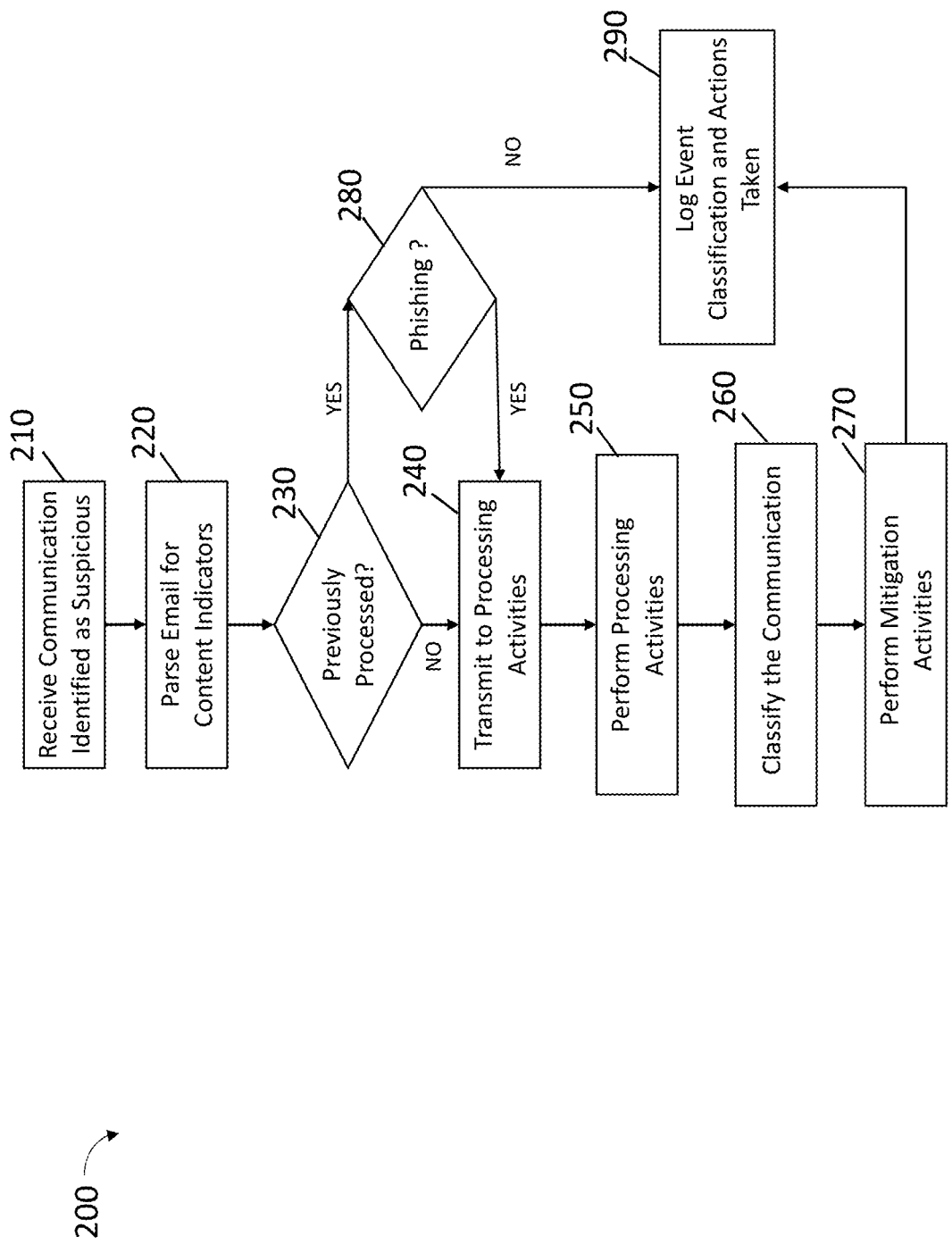
FIG. 2 illustrates an exemplary process flow according to an exemplary method for classifying and mitigating security threats in digital communication networks.

Referring now to FIG. 2, a flowchart of an exemplary process flow 200 for classifying and mitigating security threats in digital communication networks is provided. It will be appreciated that the illustrated process flow and associated steps may be performed in a different order, with illustrated steps omitted, with additional steps added, or with a combination of reordered, combined, omitted, or additional steps. At step 210, a digital communication identified as suspicious by a user, e.g. user 102, is received at the exemplary classification and mitigation system 120.

At step 220, the communication may be parsed for content indicators. For example, some digital communications may contain a variety of content indicators, such as, but not limited to, links within the email, sender's address, the subject line, attachments, who the recipient(s) is, the domain/IP address the email is sent from, and general keywords or spellings contained in the body of the message or communication. Content indicators may be updated and/or modified according to trends in malicious content surrounding digital communications. In some embodiments, the content indicators may be automatically updated based on observed malicious content. In some embodiments, content indicators may vary according to the type of message being received, the recipient of the communication, and/or the business unit of the recipient. For example, specific content indicators may be applied for a digital communication identified by IT support staff while different content indicators may be applied to a digital communication identified by an executive or similar business-critical user.

In some embodiments, content indicators may reveal the email to be a training communication, e.g. a training communication from training system 140. In some embodiments, training communications may be automatically generated based on observed and/or logged malicious content indicators. In certain embodiments, upon determination that a digital communication is a training communication, for example, through analysis of one or more content indicators, a notification may be generated and transmitted to the user 102 indicating that the digital communication was a part of awareness training. Training system 140 may be further configured to send additional training messages to user 102 based on their handling of prior training messages.

At step 230, the digital communication may be analyzed to determine if it has been previously processed, e.g. the same communication was identified by a different user at a different time and processed by the classification and mitigation system 120. Analysis of content indicators may be used to determine that the identified communication has been previously processed. For example, the content indicators may be compared with content indicators of previously processed messages, wherein when a match or a sufficiently close match is found, the digital communication may be determined to be previously processed. If the digital communication has not been previously processed, in step 240 it is transferred for processing activities, e.g. those performed at software modules 124 and/or machine learning module 125. If the digital communication has been previously processed, at step 280 it is determined whether the communication is related to a phishing attempt. Such a determination may be made based on the observed content indicators and/or via reviewing logs related to the communication or similar communications, for example, at event management system 122. If the communication relates to phishing, the communication may be transmitted for addition processing or reprocessing at step 240. Reprocessing of a communication is beneficial in the case of phishing because the additional processing may better determine the source of the phishing attempt. In certain phishing attempts links may be used to redirect an unsuspecting user to an external website where they may input sensitive information. In some cases, the source of the phishing communication may change the location the user is redirected to, for example, because one location has been recognized as fraudulent but a second location has not. Reprocessing such communications can improve the ability of the system to identify the malicious content within the message. In certain embodiments, additional communication content indicators may be used to trigger additional processing and/or reprocessing. If it has been determined not to be a phishing communication, the previous event classification is logged. If a communication is determined to have been previously processed, but not directed to phishing, the event may be logged at step 290.

At step 250, the processing activities may be performed, e.g. via software modules 124 and/or machine learning module 125, to process and identify malicious content and characteristics of the communication. In some embodiments, processing activities may comprise processing a communication using third-party applications and other software through which the digital communication is processed to generate outputs. For example, third-party applications used may be, but is not limited or restricted to, FireEye Email Security, VirusTotal, ThreatConnect Analysis, Cuckoo Sandbox Analysis, BlueCoat Analysis, etc. The outputs generated by the processing activities may be standardized, for example, by classification and mitigation system 120, e.g. at classification system 126. In some embodiments, if the processing activity confirms that a communication is from an external source, the communication may be stored, e.g. at event management system 122.

At step 260, the communication is classified, e.g. at classification system 126. It is appreciated that the classification reached by classification system 126 may also be referred to herein as a verdict. In some embodiments, the communication may be classified as one of malicious, non-malicious, or spam. In certain embodiments, classification may be unable to be determined, and the communication may be forwarded to an alert triage where additional analysis may be performed to properly classify the communication. If a communication is classified as malicious or spam, at step 270, in response to the classification made at step 260, mitigation activities may be performed, e.g. by mitigation engine 128. It will be appreciated that, in some embodiments, classification of the communication may be performed according to outputs generated by the processing activities performed at step 250. If mitigation activities are performed, the event and activities performed may be logged at step 290.

Figure 3:
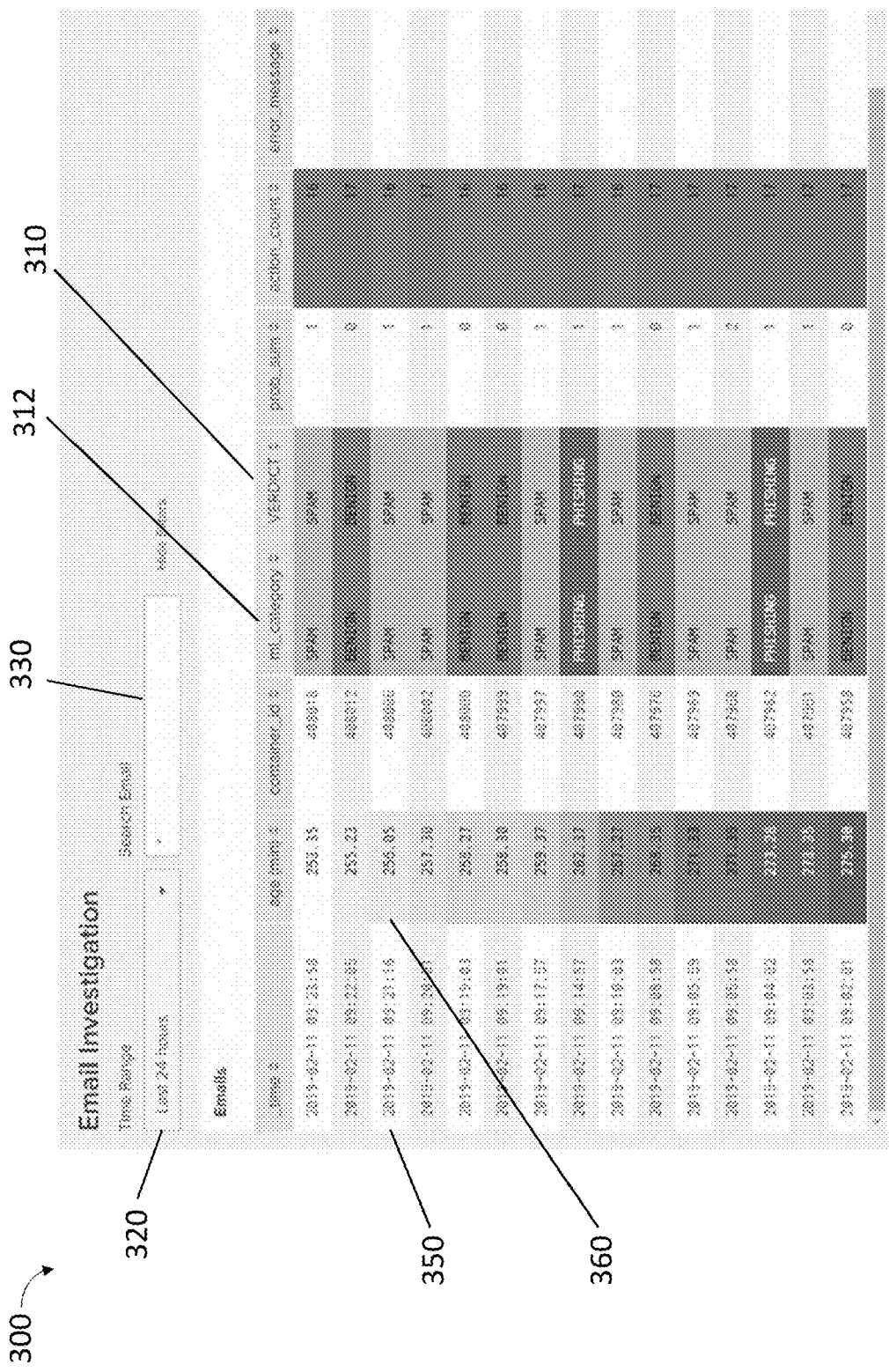
FIG. 3 illustrates an exemplary user interface for use with an exemplary system for classifying and mitigating security threats in digital communication networks.

FIG. 3 shows an exemplary embodiment of a user interface 300 of an exemplary email classification and mitigation system. The result of classification of a communication, e.g. at classification engine 126, may be shown by verdict 310. In some embodiments, a classification using only the processing activities performed at machine learning module 125 is shown by ml category 312. As previously described, classification engine 126 may compare classification verdicts obtained from different processing activities, e.g. those performed using software modules 124 and/or machine learning module 125. User interface 300 may be configured to display additional information relating to verdict 310, such as, but not limited to, the name and/or description of the software modules 124 considered, the number of modules considered (e.g. between software modules 124 and machine learning module 125), the number of modules making a positive identification of the communication (e.g. according to a specific confidence interval), etc.

As described with regard to classification and mitigation system 120, a communication may be classified as malicious, non-malicious, or spam. In certain embodiments, and as shown at verdict 310, a communication classified as malicious may be tagged with an indicator such as "phishing" to more accurately describe the type of malicious communication. It will be appreciated that in certain embodiments, additional visual indicators, such as, for example, color coding, may be used to indicate the severity of the classification. In some embodiments, user interrace 300 may be configured to sort classified communication, e.g. by time range 320, timestamp 350, age 360, etc. Time range 320 may limit the communications shown at the user interface 300 to those classified during a specific time frame, for example, the last 24 hours. Time ranges may include, but are not limited to, the last 24 hours, the past week, month, year, or all time. Timestamp 350 may indicate an exact date and time relating to when the communication was received, when a communication was reported, and/or when the communication was classified. The age 360 may similarly be used to keep a running time measured from the origination event used in timestamp 350 to present. User interface 300 may be further configured to enable a search of classified communications using search 330. In certain embodiments, search 330 is configured to access communications and/or their characteristics at an email storage, e.g. event management system 122. It will be appreciated that user interface 300 may be customizable according to user preference and various filters, sort options, and the like may differ.

The term "module" or "engine" used herein will be appreciated as comprising various configurations of computer hardware and/or software implemented to perform operations. In some embodiments, modules or engines as described may be represented as instructions operable to be executed by a processor and a memory. In other embodiments, modules or engines as described may be represented as instructions read or executed from a computer readable media. A module or engine may be generated according to application specific parameters or user settings. It will be appreciated by those of skill in the art that such configurations of hardware and software may vary, but remain operable in substantially similar ways.

It is to be understood that the detailed description is intended to be illustrative, and not limiting to the embodiments described. Other embodiments will be apparent to those of skill in the art upon reading and understanding the above description. Moreover, in some instances, elements described with one embodiment may be readily adapted for use with other embodiments. Therefore, the methods and systems described herein are not limited to the specific details, the representative embodiments, or the illustrative examples shown and described. Accordingly, departures may be made from such details without departing from the spirit or scope of the general aspects of the present disclosure.

What is claimed is:

1. A computer implemented method for classifying and mitigating security threats in a digital communication network, the method comprising:
receiving a digital communication from a user, wherein the digital communication has been identified as suspicious by the user;
parsing the digital communication to identify at least one content indicator;
performing at least one processing activity based on the at least one content indicator, wherein performance of the at least one processing activity generates an output;
determining whether the digital communication comprises malicious content based on the output generated by the at least one processing activity;
performing at least one mitigation activity when the digital communication comprises malicious content;
determining whether the digital communication has been previously processed;
when the digital communication has been previously processed, determining when the digital communication is related to phishing; and
when the digital communication is related to phishing, performing at least the one processing activity for at least a second time in order to determine a source of the phishing,
wherein at least one from among the parsing of the digital communication, the performing of the at least one processing activity, the determining of whether the digital communication comprises malicious content, and the performing of the at least one mitigation activity comprises applying a machine learning module that is trained using a set of communications that are exemplary of malicious or suspicious content.

2. The method of claim 1, further comprising: standardizing the output generated by the at least one processing activity.

3. The method of claim 2, further comprising: determining whether the digital communication comprises malicious content based on the standardized output.

4. The method of claim 1, further comprising: classifying the digital communication as one of malicious, non-malicious, or spam.

5. The method of claim 4, further comprising: notifying the user of the classification of the digital communication.

6. The method of claim 4, wherein when the digital communication is classified as spam, performing at least one spam mitigation activity.

7. The method of claim 1, further comprising: logging the at least one mitigation activity performed at an event management system.

8. The method of claim 7, wherein the digital communication is determined as previously processed based on the at least one content indicator.

9. A system for classifying and mitigating security threats in digital communication networks, the system comprising:
a classification and mitigation system configured to:
receive a digital communication from a user, wherein the digital communication has been identified as suspicious by the user;
parse the digital communication to identify at least one content indicator;
perform at least one processing activity based on the at least one content indicator, wherein performance of a processing activity generates an output;
determine whether the digital communication comprises malicious content based on the output;
perform at least one mitigation activity when the digital communication comprises malicious content;
determine whether the digital communication has been previously processed;
when the digital communication has been previously processed, determine when the digital communication related to phishing; and
when the digital communication related to phishing, performing at least one processing activity for at least a second time in order to determine a source of the phishing,
wherein the classification and mitigation system is further configured to perform at least one from among the parsing of the digital communication, the performing of the at least one processing activity, the determining of whether the digital communication comprises malicious content, and the performing of the at least one mitigation activity by applying a machine learning module that is trained using a set of communications that are exemplary of malicious or suspicious content.

10. The system of claim 9, wherein the classification and mitigation system is further configured to standardize output generated by the at least one processing activity.

11. The system of claim 10, wherein the classification and mitigation system is further configured to determine when the digital communication comprises malicious content based on the standardized output.

12. The system of claim 9, wherein the classification and mitigation system is further configured to classify the digital communication as one of malicious, non-malicious, or spam.

13. The system of claim 12, wherein the classification and mitigation system is further configured to notify the user of the classification of the digital communication.

14. The system of claim 12, wherein the classification and mitigation system is further configured to perform at least one spam mitigation activity when the digital communication is classified as spam.

15. The system of claim 9, wherein the classification and mitigation system is further configured to log the at least one mitigation activity performed at an event management system.

16. The system of claim 9, wherein the digital communication is determined as previously processed based on the at least one content indicator.

17. A method for training users to classify and mitigate security threats in a digital communication network, the method comprising:
transmitting a training communication to a user, wherein the training communication has at least one suspicious content indicator;
receiving a digital communication from the user, wherein the digital communication has been identified as suspicious by the user;
parsing the digital communication to identify the at least one suspicious content indicator;
determining whether the digital communication received from the user is the same as the training communication;
when the digital communication received from the user is the same as the training communication, sending the user a notification indicating completion of training;
determining whether the digital communication has been previously processed;
when the digital communication has been previously processed, determining when the digital communication is related to phishing; and
when the digital communication is related to phishing, performing at least one processing activity for at least a second time in order to determine a source of the phishing,
wherein at least one from among the parsing of the digital communication, the performing of the at least one processing activity, the determining of whether the digital communication comprises malicious content, and the performing of the at least one mitigation activity comprises applying a machine learning module that is trained using a set of communications that are exemplary of malicious or suspicious content.

18. The method of claim 17, wherein the digital communication is determined as previously processed based on the at least one content indicator.

* * * * *